J. A. VOGT.
TRACTIVE ELEMENT.
APPLICATION FILED OCT. 31, 1918.

1,319,257.

Patented Oct. 21, 1919.
2 SHEETS—SHEET 1.

INVENTOR
J. A. VOGT

BY J. M. Wright,

ATT'Y

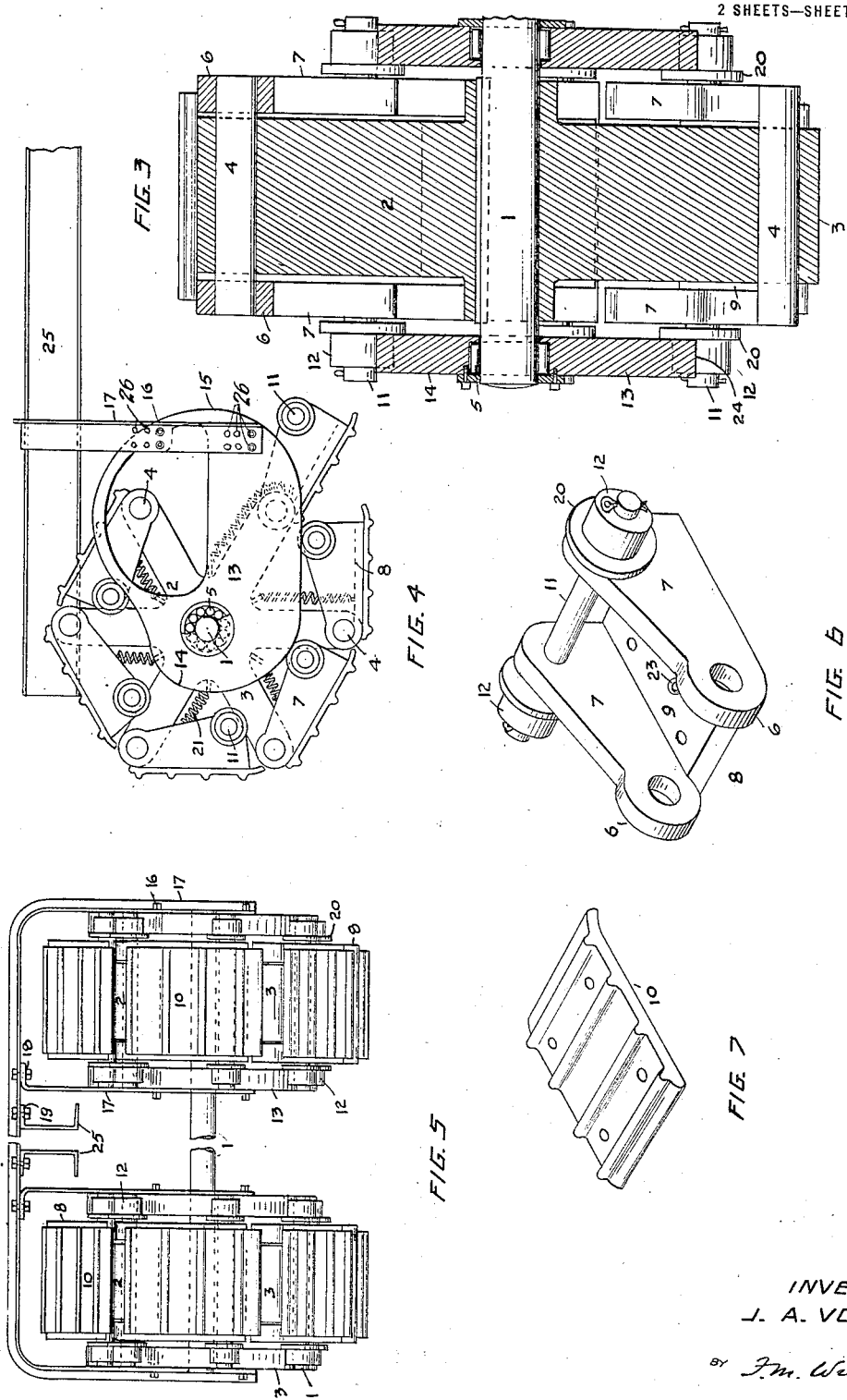
J. A. VOGT.
TRACTIVE ELEMENT.
APPLICATION FILED OCT. 31, 1918.
1,319,257.
Patented Oct. 21, 1919.
2 SHEETS—SHEET 2.
INVENTOR
J. A. VOGT
BY F. M. Wright,
ATT'Y.

UNITED STATES PATENT OFFICE.

JOHN A. VOGT, OF OAKLAND, CALIFORNIA, ASSIGNOR TO ELEPHANT TREAD WHEEL COMPANY, OF SACRAMENTO, CALIFORNIA, A CORPORATION OF CALIFORNIA.

TRACTIVE ELEMENT.

1,319,257.  Specification of Letters Patent.  Patented Oct. 21, 1919.

Application filed October 31, 1918. Serial No. 260,428.

*To all whom it may concern:*

Be it known that I, JOHN A. VOGT, a citizen of the United States, residing at Oakland, in the county of Alameda and State of California, have invented new and useful Improvements in Tractive Elements, of which the following is a specification.

The present invention relates to improvements in tractors, and the object of the invention is to provide a tractive element of the track-forming type, which will have a large tractive surface with only a single wheel.

Figure 1:
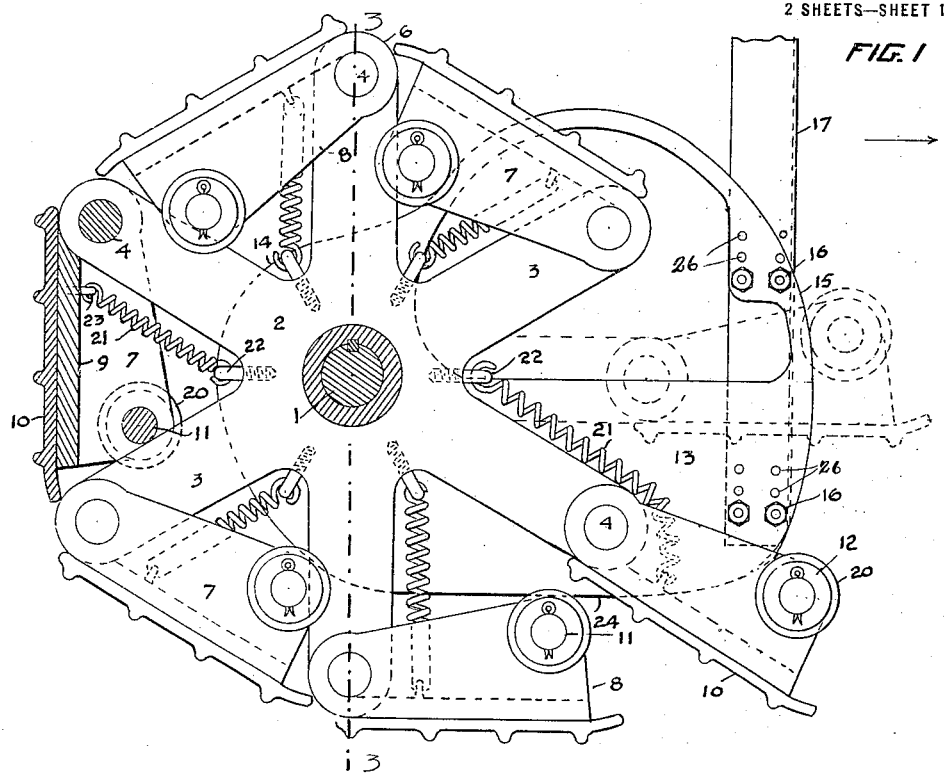
Figure 2:
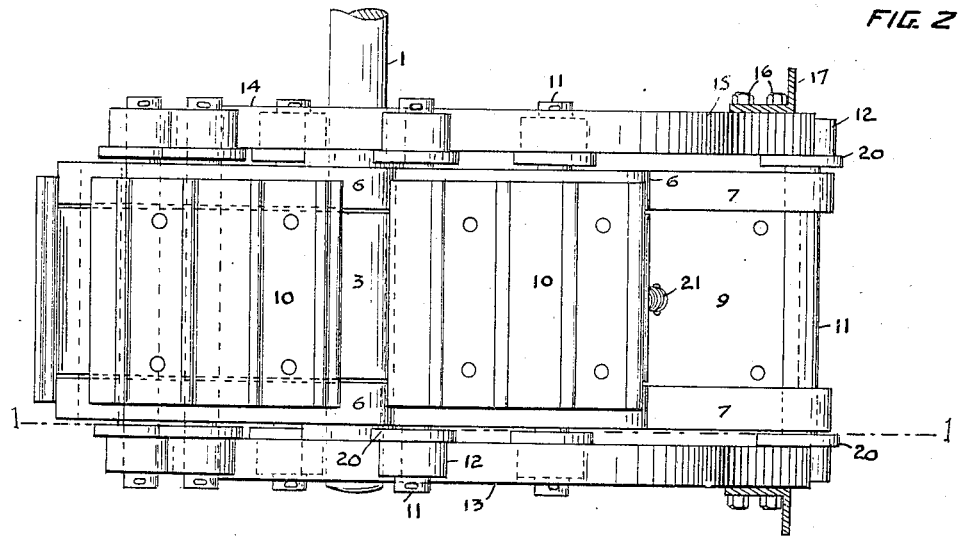

In the accompanying drawing, Figure 1 is a vertical sectional view of my improved tractive element on the line 1—1 of Fig. 2; Fig. 2 is a plan view thereof; Fig. 3 is a vertical sectional view on the line 3—3 of Fig. 1; Fig. 4 is a side view and Fig. 5 is a rear view, on a smaller scale, showing a pair of said elements and means for supporting a tractor frame thereon; Fig. 6 is a perspective view of a traveling foot; and Fig. 7 is a similar view of a shoe.

Referring to the drawing, 1 indicates a driving shaft, to which is secured a drive wheel 2 having spokes 3 of any desired number, here shown as six. Transversely through the outer end of each spoke extends a shaft 4 having projecting ends on which are pivoted ends 6 of vertically extending sides 7 of a traveling foot 8, said feet thus constituting an endless series, said sides being connected by a web 9, so that, as each foot swings on its shaft or pivot 4, its sides 7 move adjacent to the corresponding spoke 3. To the outer surface of said foot is removably attached a shoe 10. Through the other ends of said sides extends a transverse shaft 11 carrying rollers 12 outside said sides 7, and spacing said sides from said rollers are flanges 20. Said rollers are adapted to contact with the peripheries of guiding means 13 in the form of plates, here shown as supported by roller bearings 5 on the shaft 1, of which plates 13 rear portions 14 are circular in form, while front portions 15 are cam-shaped and extend considerably farther to the front of the shaft 1 than do the rear portions 13 to the rear thereof. When the tractive element is operated by means of gears or chains, the guide plates are fixed to the shaft and suitable bearings are used in the hub of the drive wheel 2. The flanges 20 thus also serve to guide the feet 8 between said guide plates when the feet are off the ground, and to maintain and support the guide plates in proper registry with the feet when the latter are on the ground, especially preventing displacement thereof due to side strain when the tractor is on a hill side. The upper parts of the front portions 15 are cut out to reduce their weight. Said guide plates serve to transmit the weight of the tractor to the feet 8 both directly, and indirectly through the shaft 1, and to transmit the weight of the tractor to the plates 13 there are secured to said guide plates 13, on each side of the wheel, by bolts 16, vertically extending supports 17, those on the outer side of the wheel being bent inward at the top and connected, as shown at 18, with those on its inner side and being then extended farther inwardly and connected, as shown at 19, to a longitudinally extending channel bar 25 forming part of the frame of the tractor.

Stretched coiled springs 21 are connected at their inner ends, as shown at 22, to the parts of the wheel between the inner ends of the spokes, and at their outer ends, as shown at 23, to the webs 9, and tend to restore the feet to their innermost or normal positions when extended therefrom.

The mode of operation of my improved tractive element is as follows: By the rotation of the driving shaft 1, the wheel 2 secured thereto is also rotated, carrying with it the feet 8. As each foot ascends at the rear of the wheel, the rear edge of its shoe 10 engages the ends 6 of the sides of the next succeeding foot 8, and the shaft 11 is in close proximity to the next succeeding spoke 3. The rollers 12 of said foot are then out of contact with the rear portions 14 of the guide plates 13. When they arrive at points over the shaft 1, said rollers 12 engage the peripheries of the guide plates by reason of said guide plates widening out at the front, and in their advance, by reason of said guide plates extending forwardly from the shaft 1 more than they extend rearwardly therefrom, said rollers are caused to move outwardly, away from the shaft 1, while the other ends of the feet, being pivoted on the ends of the spokes 3, remain at the same distance as before from the shaft 1. This outward movement continues until, when the rollers 12 are traveling on the extreme front portions of the said plates, they are nearly in the same plane as the shafts 1 and 4. When a spoke 3 moves downwardly from this point, the outer end of the corresponding foot 8 drops, until the spoke 3 arrives at such a position in the rotation in the shaft 1 that the outer end of the shoe 10 touches the land surface. Then the further movement of the spoke 3 downward brings the rollers 12 into position under straight horizontal portions 24 of the guide plates, from which point said rollers 12, in conjunction with those of the foot immediately ahead, the front end of which is now moving upwardly, support the weight of the tractor body and engine. The portions 24 of the guide plates thus form straight level tracks which move in succession on an endless series of pairs of rollers 12 which are supported by feet resting on the ground. While the tracks 24 thus travel on said rollers 12, the shoes 10 are horizontal and rest upon the ground. The cycle of movement of the foot is then repeated. When the rollers 12 leave the horizontal lower portions 24 of the peripheries of the guide plates, they are drawn inward by the springs 21, thus avoiding the hammering noise which would otherwise be occasioned. In addition the springs hold the feet in their innermost position on the reverse motion of the chain of feet when backing the tractor.

The connections by which the guide plates are secured to the supports 17 are adjustable by providing a series of holes 26 in the guide plates, so the manner in which the foot approaches the ground may be varied according to the nature of the latter. Guide plates of different shapes may also be used.

An important advantage of my invention over others of the track-laying type is that only a small percentage of the moving parts are in active operation at any one time, thus greatly reducing friction and wear.

It will thus be seen that I have provided a tractive element of the track-forming type, in which a track is formed having considerable extent of tractive surface with the use of one wheel only.

I claim:

1. In a tractor, a tractive element comprising a rotary device, feet pivoted at spaced points to said device, contact devices carried at their free ends, and stationary guiding means engaging said contact devices to swing said feet on their pivots, said guiding means having a lower horizontal portion arranged to engage the contact devices in their movement with the rotary device to move the lower portions of the feet to substantially horizontal positions.

2. In a tractor, a tractive element comprising a rotary device having radially extending spokes, feet pivoted to the free ends of said spokes, contact devices carried at the free ends of said feet, and stationary guide plates engaging said contact devices to swing said feet on their pivots, said guide plates having lower horizontal portions arranged to engage the contact devices to move the lower portions of the feet to substantially horizontal positions.

3. In a tractor, a tractive element comprising a rotary device, feet pivotally connected at spaced points to said device, contact devices carried by said feet at points other than their pivotal connections, and stationary guiding means engaging said contact devices to swing said feet on their pivots, said guiding means having a lower portion arranged to engage the contact devices in their movement with the rotary devices to move the lower portions of the feet to substantially horizontal positions.

JOHN A. VOGT.

Copies of this patent may be obtained for five cents each, by addressing the "Commissioner of Patents, Washington, D. C."